United States Patent [19]
Hoogerwerf et al.

[11] Patent Number: 6,035,188
[45] Date of Patent: Mar. 7, 2000

[54] ACTIVE WAVEFORM COLLECTION FOR USE IN TRANSMITTER IDENTIFICATION

[75] Inventors: David N. Hoogerwerf, Everett; Evan R. Green, Bothell; David M. Stanhope, Tacoma, all of Wash.; Randy McKernan, Graton, Calif.

[73] Assignee: Cellular Technical Services Company, Inc., Seattle, Wash.

[21] Appl. No.: 08/670,489

[22] Filed: Jun. 27, 1996

[51] Int. Cl.[7] ...................................................... H04Q 7/20
[52] U.S. Cl. ........................ 455/411; 455/411; 455/408; 455/410
[58] Field of Search ..................... 455/411, 410, 455/408

[56] References Cited

U.S. PATENT DOCUMENTS

| | | | |
|---|---|---|---|
| 5,005,210 | 4/1991 | Ferrell | 455/115 |
| 5,315,636 | 5/1994 | Patel | 379/58 |
| 5,329,591 | 7/1994 | Magrill | 380/25 |
| 5,420,910 | 5/1995 | Rudokas et al. | 379/59 |
| 5,448,760 | 9/1995 | Frederick | 455/56.1 |
| 5,535,431 | 7/1996 | Grube et al. | 455/411 |
| 5,555,192 | 9/1996 | Grube et al. | 455/411 |
| 5,555,551 | 9/1996 | Rudokas et al. | 379/59 |
| 5,625,869 | 4/1997 | Nagamatsu et al. | 455/411 |
| 5,633,914 | 5/1997 | Rosa | 455/411 |
| 5,655,004 | 8/1997 | Holbrook | 455/411 |

FOREIGN PATENT DOCUMENTS

0 629 093 A1  12/1994  European Pat. Off. ......... H04Q 7/04

*Primary Examiner*—Wellington Chin
*Assistant Examiner*—Senai Kibreab
*Attorney, Agent, or Firm*—Seed and Berry LLP

[57] ABSTRACT

A method and system for actively and rapidly collecting reference waveforms from a large number of cellular telephones is provided. The reference waveforms are used to generate fingerprints which are used to distinguish between authorized cellular telephones and unauthorized cellular telephones. Initially, the system selects a cellular telephone whose reference waveform is desired. The selected cellular telephone is then sent a polling message such as a page or registration request. The cellular telephone receives the polling message and transmits a radio frequency (RF) signal containing a reference waveform that contains certain transmission characteristics unique to the selected cellular telephone. From the received RF signal, the reference waveform is extracted and stored. Preferably, the selected cellular telephone is polled repeatedly in order to receive a sufficiently large number of reference waveforms to be able to generate an accurate fingerprint. One method of polling the cellular telephone is by calling the selected cellular telephone through a cellular telephone system. Another method of polling the cellular telephone is by transmitting a control message such as a page, registration, audit or maintenance message.

43 Claims, 4 Drawing Sheets

ACTIVE WAVEFORM COLLECTION FOR USE IN TRANSMITTER IDENTIFICATION

TECHNICAL FIELD

The present invention relates to radio frequency communications systems, and in particular, to a system and method for collecting radio frequency waveforms of a transmitter for use in distinguishing between an authorized wireless telephone and an unauthorized wireless telephone.

BACKGROUND OF THE INVENTION

In a communications network, it is often desirable to identify and distinguish one transmitter from other transmitters operating within the network. For example, in the radio telephone industry, a cellular telephone system utilizes an electronic serial number (ESN) and a mobile telephone identification number (MIN) to provide a unique identification for each cellular telephone. To place a phone call, the individual subscriber or other authorized user of a cellular telephone dials a telephone number and presses the "Send" button. In response, the cellular telephone transmits its ESN and MIN to the cellular system so the individual subscriber can be charged for the telephone call.

Unfortunately, unscrupulous individuals illegally operate cellular telephones by "cloning" the ESN and MIN of a valid subscriber's telephone in order to obtain illegal access to the cellular system without paying for the service. A pirate can obtain the ESN and MIN of a cellular telephone by monitoring a transmission of the cellular telephone, and then programming them into another telephone for illegal use. Thus, the mere transmission of the authentic ESN and MIN are inadequate to protect a cellular telephone system from illegal use by the pirates.

In an effort to provide additional security, some cellular systems and other wireless services, authenticate cellular telephones based on the transmission of data by the cellular telephone during a call set-up process. Rather than identify the cellular telephone by its ESN and MIN alone, the system identifies a cellular telephone by its transmission characteristics. In this manner, the cellular system can reject calls from cloned cellular telephones even when those cellular telephones transmit valid ESN and MIN numbers. For example, in U.S. Pat. No. 5,005,210 issued to Ferrell on Apr. 2, 1991 ("the Ferrell patent"), incorporated herein by reference, a system is described that analyzes certain transmitter characteristics in an effort to identify the transmitter type. The system in the Ferrell patent analyzes the manner in which the modulator makes a transition to the designated carrier frequency. This transient reference waveform is used to identify the type of transmitter. The transmission characteristics of the reference waveform can be processed in different manners to create a "fingerprint" of the individual transmitter.

While the Ferrell patent describes one class of transmission characteristics that can be used as a fingerprint, other fingerprint characteristics are also known in the art. For example, U.S. Pat. No. 5,420,910 to Rudokas on May 30, 1995 ("the Rudokas patent"), incorporated herein by reference, describes an identifier, such as a radio frequency signature, that can be used to positively identify a valid cellular telephone or a known fraudulent telephone. Other types of signature or fingerprint authentication systems are also known in the art. However, all fingerprint authentication systems require at least one reference waveform, known to be generated by the authentic cellular telephone, which is used as the fingerprint itself or is used to derive a fingerprint. A fingerprint as used herein includes reference waveforms transmitted by a transmitter as well as the various transmission characteristics derived from the waveforms.

An effective fingerprint identification technique depends largely on the existence and quality of a database of stored fingerprints. In the Ferrell patent, a database of valid reference waveforms are collected by waiting for the transmitters to turn on. Not surprisingly, this type of a passive collection process may take a very long time to develop due to the unpredictability of the turn-on behavior of the transmitters. Moreover, such a passive collection process is impractical in a communications network such as a cellular telephone system in which there are millions of cellular telephones whose reference waveforms need to be collected.

It is therefore desirable to provide a system and method for rapidly collecting reference waveforms from a large number of transmitters within a relatively short period of time. The present invention provides this and other advantages, as will be illustrated by the following description and accompanying figures. In the figures, like reference numerals indicate similar components.

SUMMARY OF THE INVENTION

A method and system for actively collecting a reference waveform from a wireless telephone is disclosed. The reference waveform is used to generate a fingerprint for the wireless telephone which is used to distinguish between an authorized wireless telephone and an unauthorized wireless telephone. Initially, the present invention selects a wireless telephone whose reference waveform is desired. The selected wireless telephone is then sent a polling message such as a page or registration request. The selected wireless telephone receives the polling message and in response, transmits a radio frequency (RF) signal containing the reference waveform. The reference waveform holds certain transmission characteristics of the selected wireless telephone. The RF signal from the selected wireless telephone is received and the reference waveform is extracted. The extracted reference waveform is then stored. Preferably, the selected wireless telephone is polled repeatedly in order to receive a sufficiently large number of reference waveforms to be able to generate an accurate fingerprint. In one aspect of the invention, polling the wireless telephone is done by using a wireless transmitter to call the selected wireless telephone through a wireless switching system. In another aspect of the invention, polling is done by transmitting a control message such as a page, registration, audit or maintenance message to the selected wireless telephone.

Thus, the present invention is capable of rapidly collecting reference waveforms from a large number of wireless telephones within a relatively short period of time by actively polling the wireless telephones, rather than waiting for the wireless telephones to turn on as was previously necessary.

DETAILED DESCRIPTION OF THE INVENTION

For clarity, the present invention is described in a cellular telephone system environment. However, persons of ordinary skill in the art will appreciate that the techniques described herein may be used in any other types of wireless communications systems including personal communications services (PCS) systems, and specific multi-user radio (SMR) systems.

Figure 1:
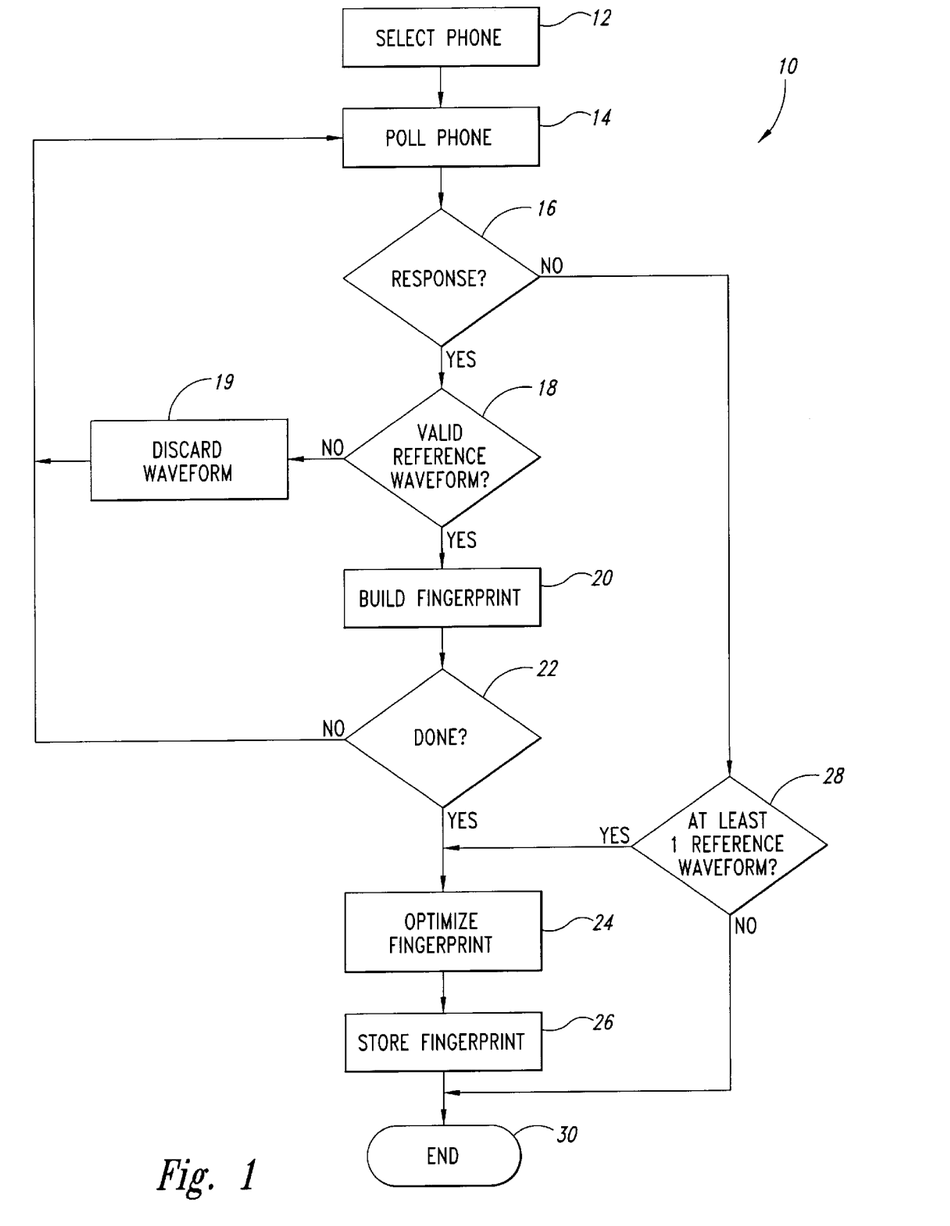
FIG. 1 is a flowchart for a method of collecting transmitter reference waveforms according to the present invention.

FIG. 1 is a flowchart of a reference waveform collection routine 10 for collecting reference waveforms that are used in building a fingerprint of a cellular telephone. The "cellular telephone" as used herein includes any mobile telephone used in single site or multiple cell site telephone systems. In step 12, the routine 10 identifies and selects a cellular telephone whose fingerprint needs to be established. In one embodiment, the routine 10 monitors active calls from a selected group of cell sites and generates a list of cellular telephones by their ESN and MIN. The cellular telephones in the list are currently transmitting on a call and are being used by users. From the list, one cellular telephone is selected. Step 12 also verifies that the selected cellular telephone is being used by an authorized user. There are many methods of verification. One method is to obtain the dialed digits of the party to which the cellular telephone is connected and compare the digits against a database of frequently called numbers of the selected cellular telephone. If there is a match, the routine 10 assumes that the cellular telephone in use belongs to an authorized user rather than a pirate. Other methods of verification include comparing the dialed digits against a database of known telephone numbers previously called by cloned phones. If there is a match, then the routine 10 assumes a pirate is operating the cloned telephone and the verification fails. Once the cellular telephone passes the verification process, the routine 10 waits until the telephone hangs up.

Upon hang-up, the routine 10 is ready to start collecting reference waveforms from the transmitter of the selected cellular telephone. At step 14, a polling message is sent to the cellular telephone. Polling as used herein includes any transmission event capable of eliciting a suitable transmission response from the selected cellular telephone. Preferably, a page, registration, audit or maintenance message is used as the polling message so that the process of polling occurs in the background for the sole purpose of collecting reference waveforms from the selected cellular telephone. In this way, the process is totally transparent to the user and multiple reference waveforms may be collected from time to time without ever bothering the user of the cellular telephone.

In response to the poll, the selected cellular telephone turns on its transmitter and transmits an RF signal containing a response message and a reference waveform. In one embodiment, the reference waveform may be the turn-on transient, represented by the leading portion of the RF signal, or the turn-off transient, represented by the trailing portion of the RF signal, of the cellular telephone's transmitter. Such reference waveforms are described in greater detail in the Ferrell patent. At decision 16, the routine 10 checks for a response from the selected cellular telephone. If there is no response within a predetermined time period, control passes to step 28. If there is a response, however, the reference waveform contained in the RF signal is obtained and stored, and control passes to decision 18. While the stored reference waveform may be an actual RF waveform, it is preferably a baseband demodulated waveform.

At decision 18, a check is made to ensure that the received reference waveform is valid. For example, in decision 18 a check is made for the receipt of multiple reference waveforms and whether the reference waveform was received from a cell site other than the group of selected cell sites. Either condition may signify that a cloned cellular telephone may be operating at the same time as the selected cellular telephone. In decision 18, a check is also made of the quality of the received reference waveform. As can be appreciated, the quality of the reference waveform is affected by many factors such as the location of the cellular telephone, strength of the battery in the cellular telephone, multipath interference, or other sources of radio frequency interference. Thus, if the received reference waveform grossly deviates from an expected reference waveform, step 19 is executed and the received reference waveform is discarded. Subsequently, control passes to step 14 where the cellular telephone is polled again. However, if the received reference waveform is determined to be valid, step 20 is executed.

In the routine 10, steps 14–22 are repeated until a sufficient number of valid reference waveforms are collected. As the reference waveforms are collected, step 20 builds a fingerprint of the selected cellular telephone. In one embodiment, certain transmission characteristics including turn-on transmitting amplitude, phase modulation versus time, and deviation from a center frequency may be derived from the received reference waveforms. The process of obtaining such a fingerprint is described in more detail in the Ferrell patent. Alternatively, a fingerprint may comprise a composite mean waveform derived from the received reference waveforms, and standard deviation and variance of the received reference waveforms. The process of obtaining such a fingerprint is described in more detail in a related application, entitled "ADAPTIVE WAVEFORM MATCHING FOR USE IN TRANSMITTER IDENTIFICATION," filed on Mar. 6, 1996, and having a common assignee, which is incorporated herein by reference. In step 20, normalization and alignment of the waveforms with respect to each other may also be performed as part of building the fingerprint.

In decision 22, it is determined whether a sufficient number of valid reference waveforms have been collected. In one embodiment, at least 10 waveforms and preferably 20–40 waveforms is considered sufficient. Alternatively, the number of received reference waveforms may be considered sufficient when the variance of the received reference waveforms is below a predetermined threshold level.

If in decision 16 there is determined to be no response from the selected cellular telephone, in decision 28 it is determined whether at least one valid reference waveform has been received. While it is preferable to collect at least 10 waveforms, the present invention may work with only one reference waveform. If no reference waveform has been received at all, control passes to step 30 where the routine 10 ends. If there has been at least one response, however, control passes to step 24.

In step 24, the fingerprint built from step 20 is optimized. This step may be performed in real-time or at a later time when a group of cellular telephones has been processed. In step 24, a more rigorous analysis and processing of the received reference waveforms are performed in order to obtain an optimized fingerprint. The optimization step may include rejection of some of the received reference waveforms based on statistical analysis, and improved normalization and alignment of the waveforms.

In step 26, the optimized fingerprint is stored in a database. Preferably, digital data representing the received reference waveforms are also stored in the database for future use including further optimization of the fingerprint and obtaining a different type of fingerprint. As will be appreciated by persons of ordinary skill in the art, the waveform collection routine 10 may also be used to update the fingerprint database in order to obtain a new or revised fingerprint to accommodate changes that may occur over time in the transmitter of the cellular telephone. Once the optimized fingerprint is stored, the routine 10 ends at step 30.

Persons of ordinary skill in the art will appreciate that the reference waveform collection routine 10 described above provides the advantage of rapidly collecting reference waveforms from a large number of transmitters by actively polling the cellular telephones without waiting for the cellular telephones to turn on as was previously necessary. Moreover, the reference waveform collection routine occurs in the background and the users of the cellular telephones are totally unaware of the collection process. Preferably, a waveform collection system uses an already existing cellular telephone system to provide a convenient and cost-effective method of collecting reference waveforms.

Figure 2:
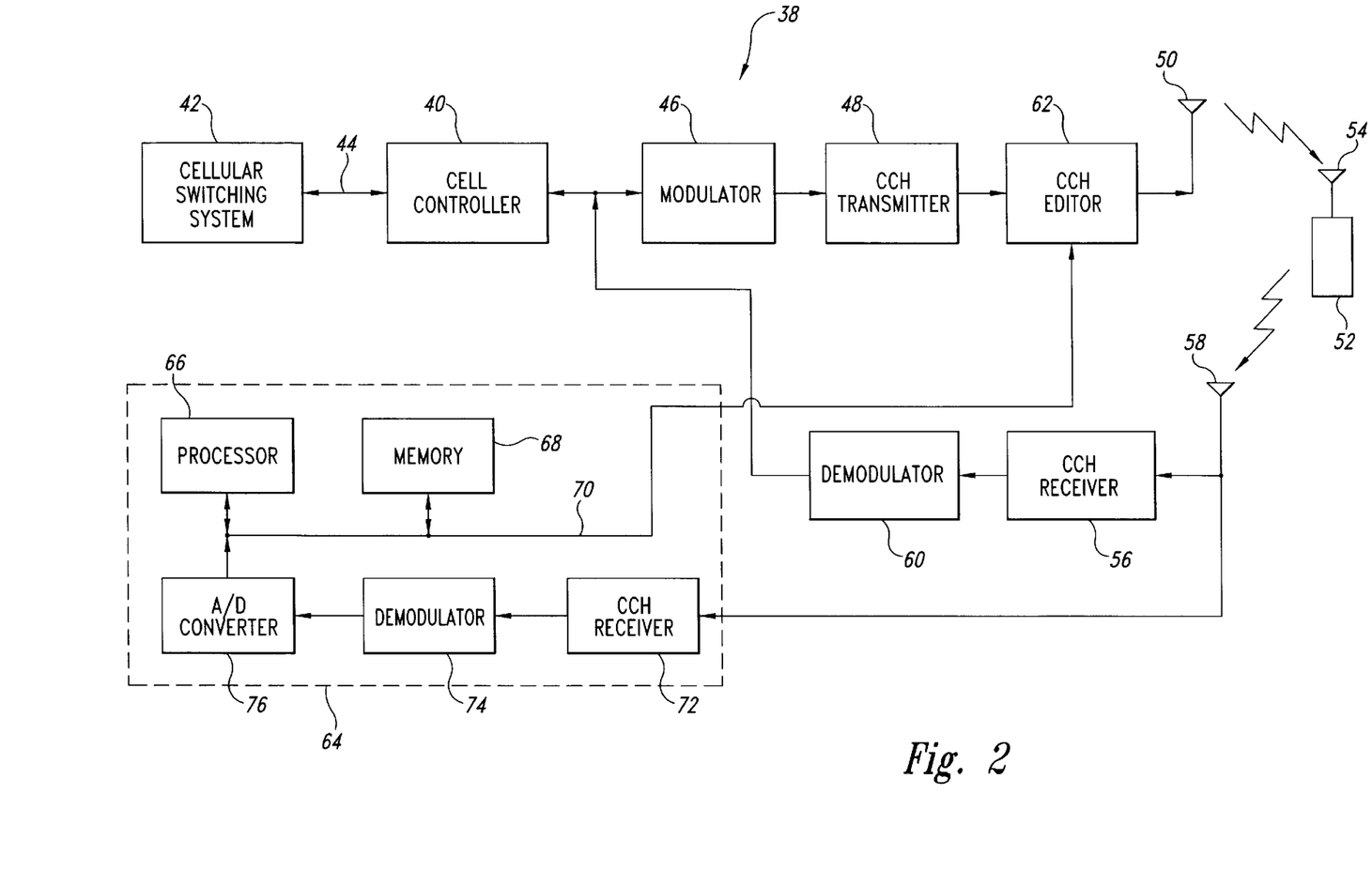
FIG. 2 is a functional block diagram of a reference waveform collection system according to the present invention.

A functional block diagram of a reference waveform collection system according to one embodiment of the present invention is shown in FIG. 2. A cell controller 40 of a cell site 38 is connected to a cellular switching system 42 through voice and control lines 44. The cellular switching system 42 is located at the cell site 38 but may be connected to multiple other cell sites. The cellular switching system 42 is in turn connected to a public switch network (not shown). A modulator 46 connected to the cell controller 40 receives control messages and modulates them onto a carrier frequency in the 800 MegaHertz (MHz) range which represents the frequency of a forward control channel. A control channel (CCH) editor 62, which will be described in greater detail below, is connected to the modulator 46 through a control channel (CCH) transmitter 48. The CCH editor 62 transmits the modulated RF signal on the forward control channel using a transmitting antenna 50. A selected cellular telephone 52 receives the transmitted RF signal through an antenna 54 and in response to the received control message, transmits on a reverse control channel an RF signal containing a response message and a reference waveform. A control channel (CCH) receiver 56 receives the RF signal from the cellular telephone 52 through a receiving antenna 58. A demodulator 60 connected to the CCH receiver 56 demodulates the RF signal into a baseband waveform. The cell controller 40 is connected to the demodulator 60 and receives the baseband waveform. The cell controller 40 retrieves the response message from the baseband waveform and performs an appropriate action according to the response message contained in the RF signal transmitted by the cellular telephone 52. The cell site 38 typically includes other modules such as voice channel (VCH) transmitters and receivers, which are omitted from FIG. 2 for clarity.

An active reference waveform collection system 64 is connected to the CCH editor 62. The waveform collection system 64 includes a processor 66 connected to a memory 68. The waveform collection routine 10 of FIG. 1 is stored in the memory 68 and is executed by the processor 66. As will be appreciated by persons of ordinary skill in the art, the waveform collection routine 10 of FIG. 1 may be executed by an already existing processor (not shown) in the cell controller 40 or in the cellular switching system 42 depending on whether the processor has sufficient processing power to handle both the call processing and waveform collection. Similarly, the waveform collection routine 10 of FIG. 1 may be stored in the memory (not shown) of the cell controller 40 or the cellular switching system 42. According to the invention, the processor 66 formats a polling message and sends it to the CCH editor 62 over a control and data bus 70. The CCH editor 62 inserts the polling message received on the control and data bus 70 into the RF signal received from the CCH transmitter 48. The CCH editor 62 is described in more detail in the Rudokas patent. The modified RF signal containing the polling message is then transmitted through the transmitting antenna 50. The selected cellular telephone 52 receives the polling message and transmits an RF signal containing a response message and a reference waveform.

The RF signal from the cellular telephone 52 is received by not only the CCH receiver 56 but also by a control channel (CCH) receiver 72 of the waveform collection system 64 through the receiving antenna 58. While the CCH receiver 72 of the waveform collection system 64 is separate from the CCH receiver 56 for timing and performance reasons, the existing CCH receiver 56 in the cell site 38 may be used instead. A demodulator 74 demodulates the RF signal received by the CCH receiver 72 into a baseband waveform. An analog to digital (A/D) converter 76 converts the baseband waveform into a digital waveform. The processor 66 extracts the reference waveform contained in the digital waveform, which is used to build a fingerprint of the transmitter of the cellular telephone 52. As discussed above, the reference waveform may be the turn-on transient, represented by the leading portion of the digital waveform, or the turn-off transient, represented by the trailing portion of the digital waveform, of the cellular telephone's transmitter. The processor then stores the reference waveform into the memory 68. While it is preferable to obtain the reference waveform from the demodulated baseband waveform, it may be obtained from the unmodulated RF waveform. This is done by connecting the A/D converter 76 to the CCH receiver 72 in order to convert the original RF waveform into a digital waveform provided that the sampling rate of the A/D converter 76 can be increased to the GigaHertz (GHz) range.

From FIG. 2, persons of ordinary skill in the art will appreciate that the present invention, including the reference waveform collection system 64 and CCH editor 62, is designed to be used with an existing cell site to provide a cost effective method of collecting reference waveforms.

Figure 3:
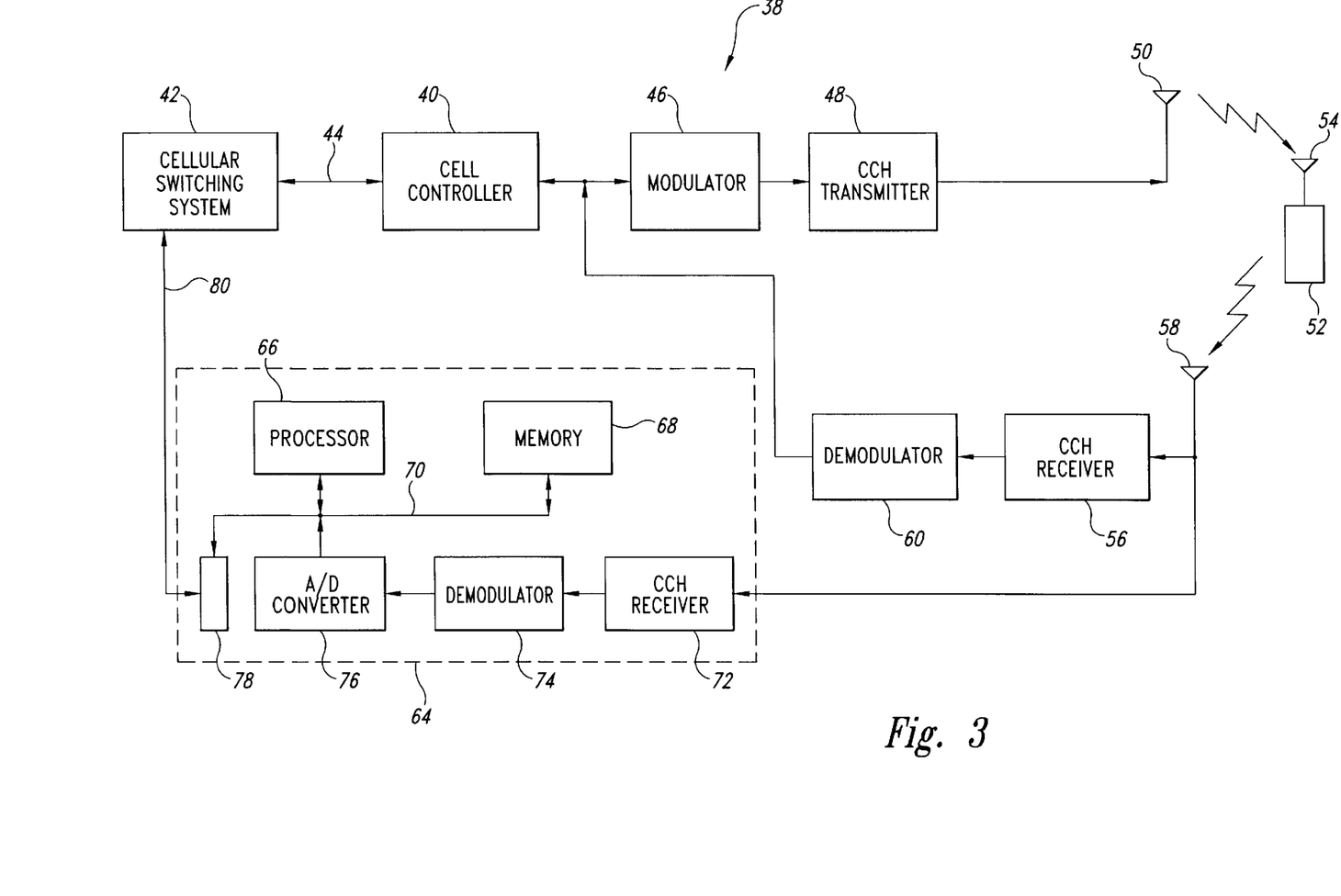
FIG. 3 is a first alternative embodiment of the reference waveform collection system of the present invention.

A functional block diagram of a first alternative waveform collection system according to the present invention is shown in FIG. 3. FIG. 3 illustrates a less intrusive way of adding the waveform collection system 64 into the cell site 38. Rather than using the CCH editor 62 of FIG. 2, in this embodiment the existing cellular switching system 42 is used to poll the selected cellular telephone 52. Specifically, the system 64 initiates a telephone call to the selected cellular telephone 52 to elicit a transmission response containing a reference waveform. Once the system 64 obtains the reference waveform, the system releases the call in progress before the selected telephone 52 rings so that the user of the selected cellular telephone 52 is unaware of the collection process.

The waveform collection system 64 includes a line interface circuit 78 and is connected to the control and data bus 70. A trunk line 80 connects the line interface circuit 78 to the cellular switching system 42. According to the invention, the processor 66 polls the selected cellular telephone 52 by dialing its telephone number through the interface circuit 78. The interface circuit 78 sends the dialed digits to the cellular switching system 42 through the trunk line 80. The trunk line 80 may be a plain old telephone service (POTS) line, integrated services digital network (ISDN) line, T1 line, subscriber loop carrier (SLC) line, or any other line that may be interfaced to the cellular switching system 42. Alternatively, a plain telephone or cellular telephone may be connected to the line interface circuit 78 rather than the trunk line 80 in order to dial the telephone number of the selected cellular telephone 52. The cellular switching system 42 sends the received dialed digits to the cell controller 40 over the voice and control lines 44. In response, the cell controller 40 sends a polling message, a page message in this case, to the selected cellular telephone 52 over the forward control channel. The cellular telephone 52 receives the polling message and transmits an RF signal containing a response message responsive to the polling message over the reverse control channel. The RF signal from the cellular telephone 52 is received by a control channel (CCH) receiver 72 of the waveform collection system 64 through the receiving antenna 58. A demodulator 74 demodulates the RF signal received by the CCH receiver 72 into a baseband waveform. An analog to digital (A/D) converter 76 converts the baseband waveform into a digital waveform. From the digital waveform, the processor 66 extracts a reference waveform to be used in building a fingerprint of the cellular telephone's transmitter. As discussed above, the reference waveform may be the turn-on transient, represented by the leading portion of the digital waveform, or the turn-off transient, represented by the trailing portion of the digital waveform, of the cellular telephone's transmitter.

When the processor 66 obtains the reference waveform from the received RF signal, it orders the interface circuit 78 to disconnect the call in progress initiated by the line interface circuit. In response, the interface circuit 78 releases the trunk line 80. The cellular switching system 42 then informs the cell controller 40 that the call has been released. Preferably, the call is released before the cell controller 40 has had a chance to assign a voice channel for the selected cellular telephone 52. Releasing the call before the voice channel assignment prevents ringing of the selected cellular telephone 52 so that the user does not know that the telephone was polled in order to collect a reference waveform. As such, multiple reference waveforms may be collected from time to time without ever bothering the user of the selected cellular telephone being polled.

Figure 4:
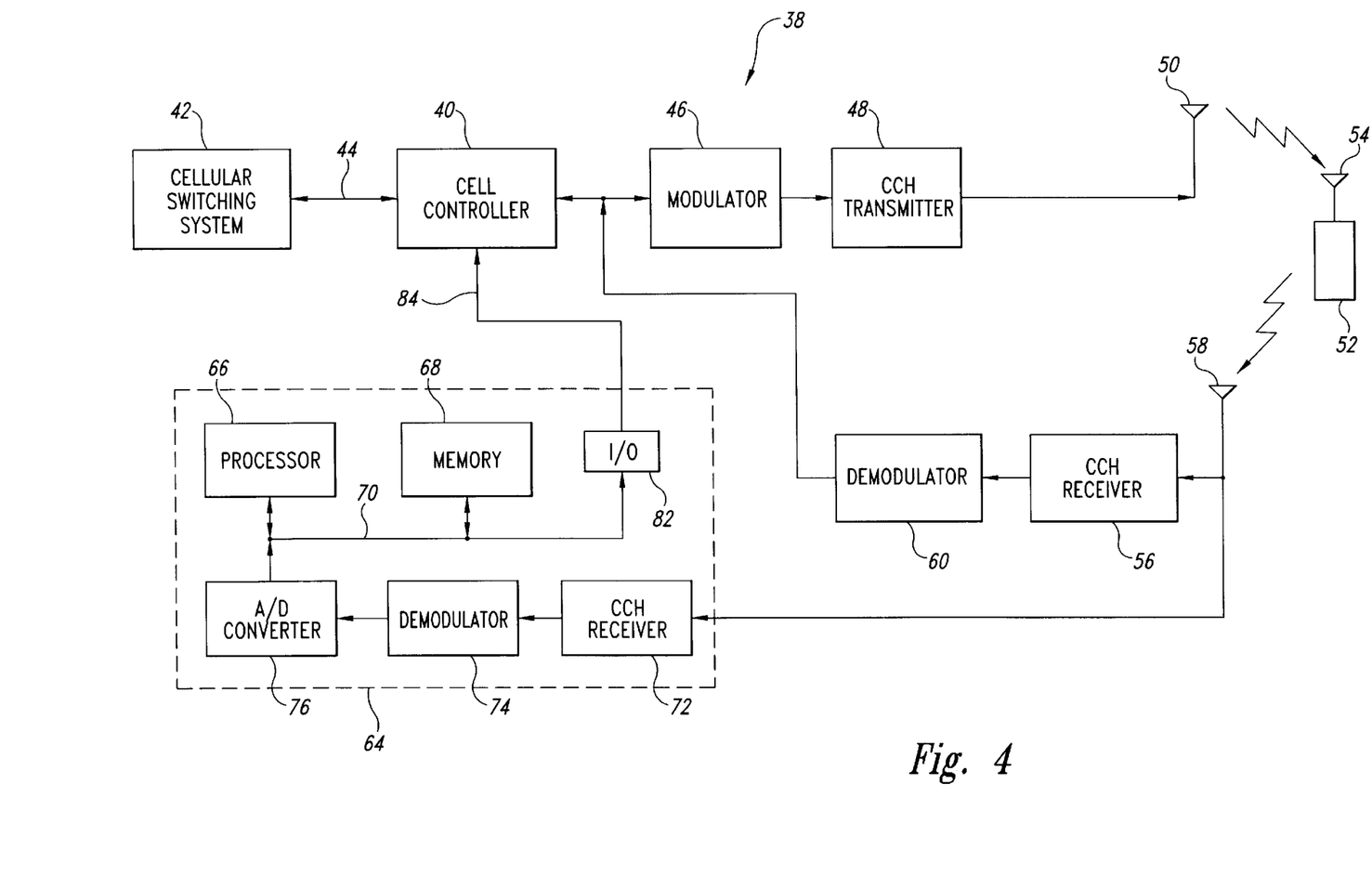
FIG. 4 is a second alternative embodiment of the reference waveform collection system of the present invention.

A functional block diagram of a second alternative reference waveform collection system according to the present invention is shown in FIG. 4. FIG. 4 illustrates another way of adding the waveform collection system 64 to the cell site 38. Rather than using the CCH editor 62 of FIG. 2, in this embodiment the existing cell controller 40 is used to poll the cellular telephone 52. An I/O interface circuit 82 is included in the waveform collection system 64 and connected to the control and data bus 70. An I/O line 84, such as a tty line, connects the I/O interface circuit 82 to a control terminal port (not shown) of the cell controller 40. The manner in which the cellular telephone 52 is polled through the I/O line 84 depends on the particular make of the cell controller 40. In some cell controllers, the processor 66 polls the cellular telephone 52 by directly inputting I/O polling commands to the control terminal port of the cell controller 40. In other controllers, the cellular telephone 52 may be polled by running a utility program stored in the cell controller 40. Alternatively, the I/O line 84 may be connected to a control terminal port (not shown) of the cellular switching system 42 to poll the selected cellular telephone 52. Again, the manner in which the cellular telephone 52 is polled through the cellular switching system 42 depends on the particular make of the switching system.

According to the present invention, a system and method for collecting reference waveforms from a transmitter of a mobile phone has been described. The present invention provides the advantage of rapidly collecting reference waveforms from a large number of transmitters by actively polling the transmitters without waiting for the transmitters to turn on as was previously necessary. Moreover, the reference waveform collection process occurs in the background and the users of the mobile phones are totally unaware of the process. In a preferred embodiment, the reference waveform collection system is designed to be used with an existing cell site to provide a cost effective method of collecting reference waveforms.

From the foregoing it will be appreciated that, although specific embodiments of the invention have been described herein for purposes of illustration, various modifications may be made without deviating from the spirit and scope of the invention. For example, although the active waveform collection systems 64 of FIGS. 2–3 are shown as integrated into an existing cell site 38, the present invention also contemplates a stand alone collection system in order to allow collection of cleaner reference waveforms under a more controlled environment. Accordingly, the present invention is not limited except as by the appended claims.

We claim:

1. A method of collecting a reference waveform of a wireless telephone comprising the steps of:
   (a) polling a selected one of a plurality of wireless telephones to automatically stimulate a transmission response signal containing a reference waveform indicative of a transmission characteristic of the selected wireless telephone;
   (b) receiving from the selected wireless telephone the transmission response signal responsive to the poll;
   (c) extracting the reference waveform from the received transmission response signal; and
   (d) storing the extracted reference waveform.

2. The method according to claim 1 wherein steps (a) to (d) are repeated until at least two reference waveforms are stored.

3. The method according to claim 2, further comprising the steps of:
   generating a fingerprint from the stored reference waveforms; and
   optimizing the fingerprint.

4. The method according to claim 3 wherein the step of optimizing the fingerprint comprises the steps of:
   aligning each stored reference waveform with respect to the other stored reference waveforms; and
   normalizing each stored reference waveform with respect to the other stored reference waveforms.

5. The method according to claim 1, further comprising the step of generating a fingerprint from the stored reference waveform.

6. The method according to claim 1 wherein step (a) comprises transmitting to the selected wireless telephone one of a page, registration, audit and maintenance message.

7. The method according to claim 1 wherein step (a) comprises transmitting a page message to the selected wireless telephone, and further including, after step (c), the step of transmitting a hang-up message to the wireless telephone to prevent the wireless telephone from ringing.

8. The method according to claim 1 wherein step (a) comprises the step of using a wireless transmitter to call the selected wireless telephone.

9. The method according to claim 1 wherein step (a) comprises the step of sending to a wireless telephone switching system a command to poll the selected wireless telephone.

10. The method according to claim 1 wherein step (a) comprises the step of sending to a cell controller located within a cell site a command to poll the selected wireless telephone.

11. A method of collecting a reference waveform of a wireless telephone comprising the steps of:
   polling the wireless telephone to automatically stimulate a transmission response signal containing a reference waveform indicative of a transmission characteristic of the wireless telephone;
   receiving from the wireless telephone the transmission response signal responsive to the poll;
   extracting the reference waveform from the received transmission response signal;
   storing the extracted reference waveform;
   validating the reference waveform when only one transmission response signal is received; and
   discarding the reference waveform when more than one transmission response signals responsive to the poll are received.

12. A method of collecting a reference waveform of a wireless telephone comprising the steps of:
   polling the wireless telephone to automatically stimulate a transmission response signal containing a reference waveform indicative of a transmission characteristic of the wireless telephone;
   receiving from the wireless telephone the transmission response signal responsive to the poll;
   extracting the reference waveform from the received transmission response signal; p1 storing the extracted reference waveform;
   selecting a wireless telephone among a plurality of wireless telephones currently transmitting on a call; and
   waiting until the selected wireless telephone hangs up before polling the selected wireless telephone to automatically stimulate a transmission response signal therefrom.

13. The method according to claim 12, further including the steps of:
   comparing the dialed digits used for the call made by the selected wireless telephone against a list of frequently called valid numbers of an authorized user of the selected wireless telephone; and
   verifying that the selected wireless telephone belongs to the authorized user by determining the dialed digits are in the list of frequently called valid numbers.

14. The method according to claim 1 wherein step (c) comprises demodulating a portion of the transmission response signal which indicates the transmission characteristic of the wireless telephone and wherein step (d) comprises storing the demodulated transmission response signal.

15. The method according to claim 14 wherein step (c) comprises demodulating a leading or trailing portion of the transmission response signal which indicates the transmission characteristic of the wireless telephone.

16. A method of collecting a plurality of reference waveforms of an authorized wireless telephone to be later used in distinguishing telephone calls made by the authorized wireless telephone from telephone calls made by an unauthorized wireless telephone, the method comprising the steps of:
   selecting the authorized wireless telephone among a plurality of wireless telephones currently transmitting on a call; and
   repeating the following steps n times where n is greater than 1:
      polling the selected wireless telephone to automatically stimulate a transmission response signal therefrom;
      receiving from the selected wireless telephone the transmission response signal responsive to the poll;
      extracting a reference waveform contained in the transmission response signal, the reference waveform indicating a transmission characteristic of the wireless telephone; and
      storing the reference waveform.

17. The method according to claim 16, further comprising the step of generating a fingerprint from the stored reference waveforms.

18. The method according to claim 16 wherein the step of polling comprises transmitting to the selected wireless telephone one of a page, registration, audit and maintenance message.

19. A method of collecting a reference waveform of an authorized wireless telephone to be later used in distinguishing telephone calls made by the authorized wireless telephone from telephone calls made by an unauthorized wireless telephone, the method comprising the steps of:
   (a) transmitting data to the authorized wireless telephone to elicit a transmission response signal from the authorized wireless telephone, the transmission response signal containing a reference waveform indicative of a transmission characteristic of the authorized wireless telephone;
   (b) receiving from the authorized wireless telephone the transmission response signal responsive to the elicitation;
   (c) extracting the reference waveform from the received transmission response signal; and
   (d) storing the extracted reference waveform.

20. The method according to claim 19 wherein step (a) comprises transmitting to the authorized wireless telephone one of a page, registration, audit and maintenance message.

21. The method according to claim 19 wherein step (a) comprises transmitting a page message to the authorized wireless telephone, and further including, after step (c), the step of transmitting a hang-up message to the authorized wireless telephone to prevent the authorized wireless telephone from ringing.

22. The method according to claim 19 wherein step (a) comprises the step of using a wireless transmitter to place a telephone call to the authorized wireless telephone.

23. The method according to claim 19 wherein step (c) comprises demodulating a portion of the transmission response signal which indicates the transmission characteristic of the authorized wireless telephone and wherein step (d) comprises storing the demodulated transmission response signal.

24. The method according to claim 23 wherein step (c) comprises demodulating a leading or trailing portion of the transmission response signal which indicates the transmission characteristic of the authorized wireless telephone.

25. The method according to claim 19 wherein steps (a) to (d) are repeated until at least two reference waveforms are stored.

26. The method according to claim 19, further comprising the step of generating a fingerprint from the stored reference waveform.

27. A method of using an existing wireless telephone system to collect a reference waveform of an authorized wireless telephone to be later used in distinguishing telephone calls made by the authorized wireless telephone and telephone calls made by an unauthorized wireless telephone over the existing wireless telephone system, the method comprising the steps of:

(a) causing the existing wireless telephone system to transmit data to the authorized wireless telephone to elicit an automatic transmission response signal from the authorized wireless telephone, the transmission response signal containing a reference waveform indicative of a transmission characteristic of the authorized wireless telephone;

(b) receiving from the authorized wireless telephone the transmission response signal responsive to the elicitation through the existing wireless telephone system;

(c) extracting the reference waveform from the received transmission response signal; and (d) storing the extracted reference waveform.

28. The method according to claim 27 wherein step (a) comprises transmitting to the authorized wireless telephone one of a page, registration, audit and maintenance message through a control channel editor.

29. The method according to claim 27 wherein step (a) comprises causing a cell controller of an existing cell site to transmit a page message to the authorized wireless telephone, and further including, after step (d), the step of causing the cell controller of the existing cell site to transmit a hang-up message to the authorized wireless telephone to prevent the authorized wireless telephone from ringing.

30. The method according to claim 27 wherein step (a) comprises the step of calling the authorized wireless telephone through a wireless telephone switching system in the existing wireless telephone system.

31. The method according to claim 27 wherein step (a) comprises the step of sending a command through a wireless telephone switching system in the existing wireless telephone system to elicit the transmission response signal from the authorized wireless telephone.

32. The method according to claim 27 wherein step (a) comprises the step of sending a command through a cell controller located within a cell site to elicit the transmission response signal from the authorized wireless telephone.

33. A system for collecting a reference waveform of an authorized wireless telephone to be later used in distinguishing telephone calls made by the authorized wireless telephone from telephone calls made by an unauthorized wireless telephone, the system comprising the steps of:

a radio frequency (RF) transmitter operable to transmit an RF signal containing a polling message only to the authorized wireless telephone;

a radio frequency (RF) receiver operable to receive from the authorized wireless telephone an automatic transmission response signal responsive to the polling message, the transmission response signal containing a reference waveform indicative of a transmission characteristic of the authorized wireless telephone;

a processor connected to the RF transmitter and receiver, the processor being operable to cause the RF transmitter to transmit the polling message to the authorized wireless telephone and to extract a reference waveform from the transmission response signal received by the RF receiver; and a memory connected to the processor for storing the extracted reference waveform.

34. The system according to claim 33, further comprising:

a control channel editor connected to the RF transmitter and operable to insert the polling message into the RF signal generated by the RF transmitter.

35. The system according to claim 33, further comprising:

a demodulator connected between the RF receiver and the processor and operable to demodulate the received transmission response signal.

36. The system according to claim 33 wherein the polling message is one of a page, registration, audit and maintenance message.

37. The system according to claim 33, further comprising:

a line interface circuit connected to the processor and operable to dial the identification number of the authorized wireless telephone, thereby causing the RF transmitter to transmit the polling message to the authorized wireless telephone.

38. The system according to claim 37 wherein the line interface circuit dials the identification number of the authorized wireless telephone over a trunk line connected to a wireless telephone switching system.

39. The system according to claim 37 wherein the line interface circuit dials the identification number of the authorized wireless telephone through a telephone connected to a public switch network.

40. The system according to claim 37 wherein the line interface circuit dials the identification number of the authorized wireless telephone through another wireless telephone.

41. The system according to claim 33, further comprising:

an input-output (I/O) interface circuit connected to the processor and operable to send a command to cause the RF transmitter to transmit the polling message to the authorized wireless telephone.

42. The system according to claim 41 wherein the I/O interface circuit sends the command over an input-output line connected to a wireless telephone switching system.

43. The system according to claim 41 wherein the I/O interface circuit sends the command over an input-output line connected to a cell controller of a cell site.

* * * * *

UNITED STATES PATENT AND TRADEMARK OFFICE
CERTIFICATE OF CORRECTION

PATENT NO : 6,035,188
DATED : March 7, 2000
INVENTOR(S) : David N. Hoogerwerf, et al.

It is certified that errors appear in the above-identified patent and that said Letters Patent are hereby corrected as shown below:

Claim 12, column 9, line 31, "p1 storing the" should read --storing the--.

Claim 12, column 9, line 31, "transmission response signal; p1 storing the extracted" should read as two separate lines --transmission response signal;-- and --storing the extracted" (Note the "p1" in the second line was omitted by the previous sentence.)

Signed and Sealed this

Eighth Day of May, 2001

Attest:

NICHOLAS P. GODICI

*Attesting Officer*      *Acting Director of the United States Patent and Trademark Office*